(12) United States Patent
Wang et al.

(10) Patent No.: US 10,424,285 B2
(45) Date of Patent: Sep. 24, 2019

(54) VIBRATION SOUNDING DEVICE

(71) Applicant: AAC Technologies Pte. Ltd., Singapore (SG)

(72) Inventors: Hongxing Wang, Shenzhen (CN); Shun Guo, Shenzhen (CN)

(73) Assignee: AAC Technologies Pte. Ltd., Singapore (SG)

(*) Notice: Subject to any disclaimer, the term of this patent is extended or adjusted under 35 U.S.C. 154(b) by 0 days.

(21) Appl. No.: 15/842,136

(22) Filed: Dec. 14, 2017

(65) Prior Publication Data

US 2018/0374465 A1 Dec. 27, 2018

(30) Foreign Application Priority Data

Jun. 27, 2017 (CN) .......................... 2017 1 0498841
Jun. 27, 2017 (CN) .......................... 2017 1 0498921
Jun. 27, 2017 (CN) ..................... 2017 2 0760411 U (51) Int. Cl.
| | |
|---|---|
| *G08B 6/00* | (2006.01) |
| *G10K 9/12* | (2006.01) |
| *H05K 5/00* | (2006.01) |
| *G10K 9/20* | (2006.01) |
| *H04M 1/02* | (2006.01) |
| *H04R 7/04* | (2006.01) |
| *H04R 1/02* | (2006.01) |

(52) U.S. Cl.
CPC ................ *G10K 9/12* (2013.01); *G10K 9/20* (2013.01); *H04M 1/026* (2013.01); *H04R 7/045* (2013.01); *H05K 5/0017* (2013.01); *H04R 1/025* (2013.01); *H04R 2400/03* (2013.01); *H04R 2440/05* (2013.01); *H04R 2499/11* (2013.01); *H04R 2499/15* (2013.01)

(58) Field of Classification Search
CPC ...... H04R 31/003; H04R 1/025; H04R 9/045; H04R 9/046; H04R 9/025
See application file for complete search history.

(56) References Cited

U.S. PATENT DOCUMENTS

| | | | |
|---|---|---|---|
| 9,818,805 B2 * | 11/2017 | Choi ..................... | G06F 1/1637 |
| 2012/0162113 A1* | 6/2012 | Lee .......................... | G08B 6/00 345/173 |
| 2012/0326854 A1* | 12/2012 | Liu ....................... | G06F 1/1626 340/407.1 |

* cited by examiner

*Primary Examiner* — Amir H Etesam
(74) *Attorney, Agent, or Firm* — IPro, PLLC; Na Xu (57) ABSTRACT

A vibration sounding device, including a screen, a rear cover arranged opposite to the screen, a border for supporting the screen and the rear cover, and a drive unit; wherein the border is perpendicular to the screen; the border comprises an internal surface perpendicular to the screen, an external surface arranged opposite to the internal surface, an upper surface and a lower surface, the upper surface and the lower surface connect the internal surface with the external surface, the upper surface is arranged opposite to the lower surface and is close to the screen, and the lower surface is close to the rear cover; and wherein the drive unit is fixed on the internal surface, and the drive unit drives the screen and/or the rear cover to vibrate and sound by the border. The vibration sounding device is favorable for thinning and miniaturization of the product.

19 Claims, 12 Drawing Sheets

VIBRATION SOUNDING DEVICE

TECHNICAL FIELD

The present disclosure relates to sounding technologies and, particularly, relates to a vibration sounding device.

BACKGROUND

With the advent of the mobile internet era, intelligent mobile devices become more and more. Among the mobile devices, the mobile phone is undoubtedly the most common and most portable mobile terminal device. At present, the mobile phone in the market generally adopts a miniature electromagnetic speaker and a miniature vibration sounding device to achieve sounding and touch feedback function, however, such structure is complicated and occupies internal space of the mobile phone, which severely limits the thinning of the mobile phone.

With the development of science and technology, the flat panel sounding technology comes into use, that is, sounding is achieved by a screen or a rear cover. Such vibration sounding device generally includes a border, a support plate, a screen, and a rear cover, the support plate, the screen, and the rear cover are fixed with the border, a drive unit is laminated onto the support plate, and the driving force provided by the drive unit passes through the support plate to the border, and then to the screen or the rear cover, so as to drive the screen or the rear cover to vibrate and sound, which has disadvantages of lower transmission efficiency and great energy losses in the whole sounding process.

In view of this, it is necessary to provide a new vibration sounding device to solve the above problems.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure.

The drawings herein are incorporated in the specification and form a part of the specification, which have shown embodiments of the present application and are used together with the specification to explain the principle of the present disclosure.

DESCRIPTION OF EMBODIMENTS

The present disclosure will be described in further detail with reference to the accompanying drawings. It should be understood that the embodiments described herein are merely intended to explain the present disclosure, but are not intended to limit the present disclosure.

Embodiment 1

Figure 1:
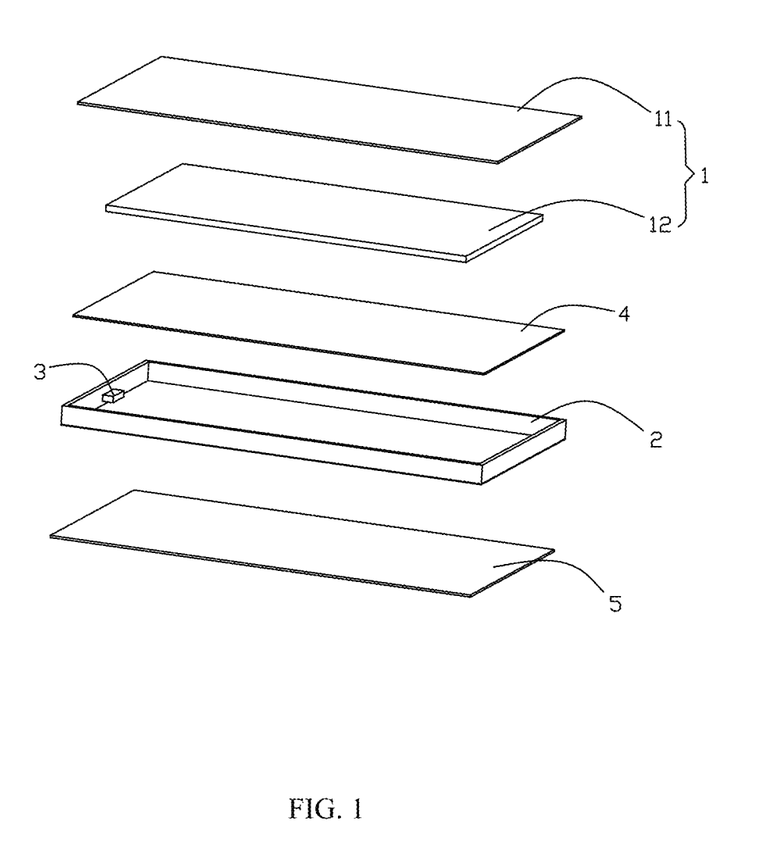
FIG. 1 is an exploded structural schematic diagram of a vibration sounding device according to Embodiment 1 of the present disclosure.
Figure 2:
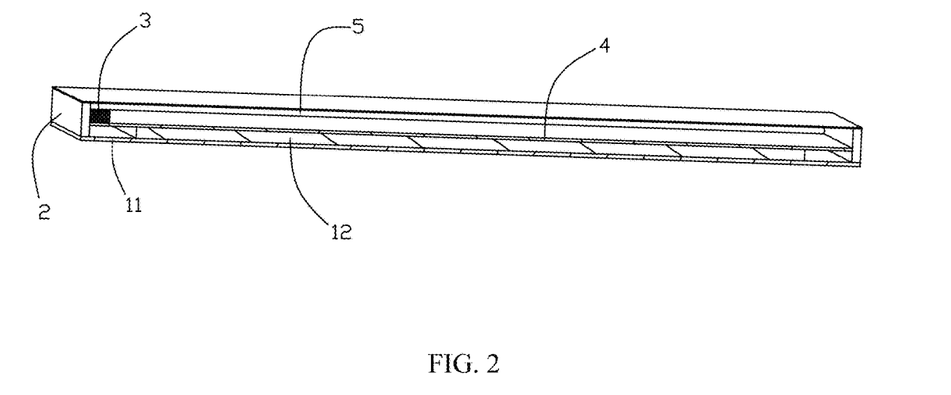
FIG. 2 is a cross-sectional view of a vibration sounding device according to Embodiment 1 of the present disclosure.
Figure 3:
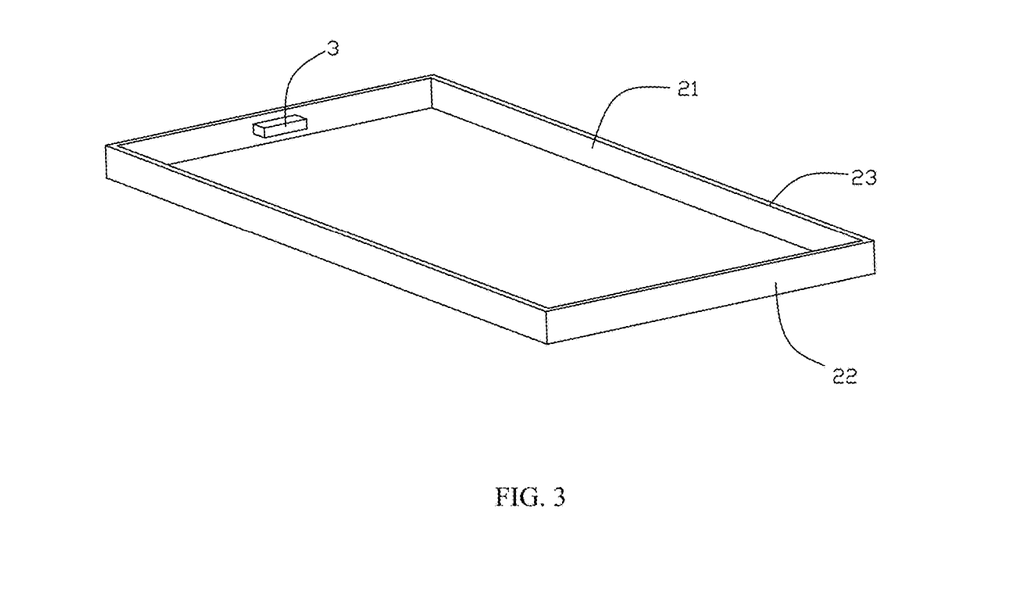
FIG. 3 is an assembling schematic diagram of a border and a drive unit of a vibration sounding device according to Embodiment 1 of the present disclosure.

As shown in FIGS. 1-3, Embodiment 1 of the present disclosure provides a vibration sounding device. The vibration sounding device includes a screen 1, a border 2 for supporting the screen 1, a drive unit 3 fixed on the border 2, a support plate 4, and a rear cover 5.

The border 2, the screen 1, and the rear cover 5 cooperatively define a closed internal space.

The border 2 is a frame structure formed by sidewalls. In the present embodiment, the border 2 includes four sidewalls, and each sidewall includes an internal surface 21 perpendicular to the screen 1, an external surface 22 perpendicular to the screen 1, an upper surface 23, and a lower surface. The external surface 22 and the internal surface 21 are opposite to each other, and the upper surface 23 and the lower surface connect the internal surface 21 with the external surface 22.

The screen 1 includes a glass panel 11 fixedly overlapping onto the upper surface 23 of the border 2, and a display screen 12 laminated on the glass panel 11.

In the present embodiment, the support plate 4 abuts against a middle position of the internal surface 21 of the border 2; the support plate 4 plays a role of supporting the display screen 12, and the display screen 12 is sandwiched and fixed between the support plate and the glass panel 11.

The rear cover 5 is fixed on the lower surface of the border 2. In other alternative embodiments, the glass panel 11 and the rear cover 5 can be embedded in the border 2, respectively, and can fixedly abut against the internal surface 21 of the border 2, as long as the function of assembling and fixation is achieved.

As shown in FIG. 2, the drive unit 3 is fixed on the internal surface of the border 2 and placed between the support plate 4 and the rear cover 5. The drive unit 3 is respectively spaced from the support plate 4, the rear cover 5, and the screen 1, and is laminated on the internal surface 21 of the border 2. Thus, the drive unit 3 does not occupy space, which is beneficial to the thinning and miniaturization of the product. The drive unit 3 transmits a driving force by the border 2 to the screen 1 and/or the rear cover 5, and drives the screen 1 and/or the rear cover 5 to vibrate and sound, and particularly, drives the glass panel 11 to vibrate and sound. The drive unit 3 is fixedly connected with the internal surface 21 of the border 2 by using an adhesive or by welding.

Embodiment 2

Figure 4:
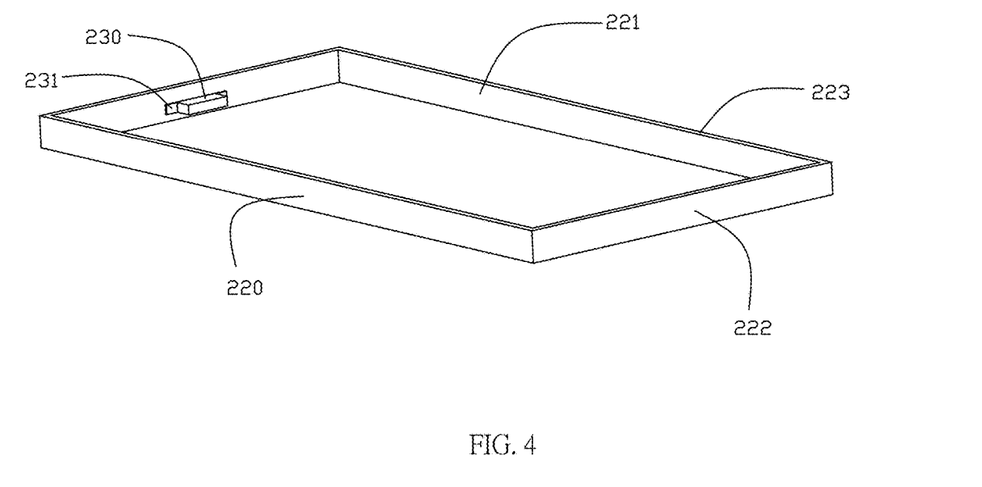
FIG. 4 is an assembling schematic diagram of a border and a drive unit of a vibration sounding device according to Embodiment 2 of the present disclosure.

As shown in FIG. 4, Embodiment 2 of the present disclosure is similar to Embodiment 1. The border 220 includes an internal surface 221, an external surface 222, an upper surface 223, and a lower surface. The upper surface 223 and the lower surface connect the internal surface 221 with the external surface 222.

In the present embodiment, the drive unit 230 includes a fixing surface laminated on the internal surface 221, and the fixing surface includes an extending portion 231 extending at both sides of the drive unit. The extending portion 231 is formed by symmetrically extending from opposite sides of the drive unit towards opposite directions, and the drive unit 230 is fixed on the internal surface 221 by the extending portion 231. Same as Embodiment 1, the drive unit 230 can be fixedly connected with the internal surface 21 of the border 220 by using an adhesive or by welding. In the present embodiment, the fixation between the drive unit 230 and the border 220 is mainly achieved by fixing the extending portion 231 with the internal surface, specifically, by using an adhesive or by welding.

The setting of the extending portion 231 can increase a contact area between the drive unit 230 and the border 220, and both adhering by using an adhesive and welding can enhance the fixing reliability of the drive unit 230 and the border 220.

Embodiment 3

Figure 5:
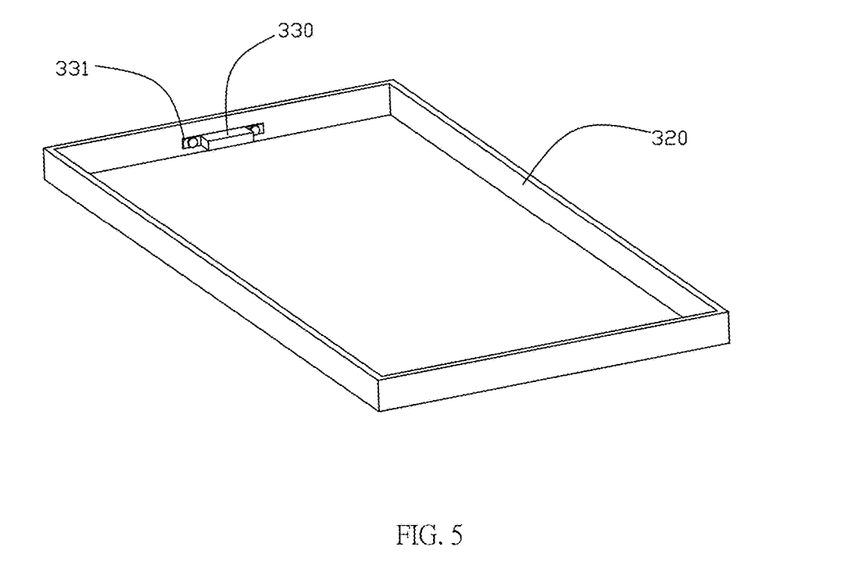
FIG. 5 is an assembling schematic diagram of a border and a drive unit of a vibration sounding device according to Embodiment 3 of the present disclosure.

As shown in FIG. 5, Embodiment 3 of the present disclosure is an improvement made on the basis of Embodiment 2.

The drive unit 330 is fixed on the border 320, the drive unit 330 includes an extending portion 331, a fixing hole is defined in the extending portion 331, and the drive unit 330 is matched and fixed with the border 320 through the fixing hole. The internal surface of the border 320 may further have a screw hole, the fixing hole corresponds to the screw hole, and the drive unit 330 is fixed with the border 320 by a screw.

In the present embodiment, the drive unit 330 includes two extending portions 331, each of which has a fixing hole, and, the drive unit 330 is fixed by two screws, thereby further improving the fixing stability of the drive unit 330. In the present embodiment, the drive unit may be fixed only by screws, or the drive unit may be fixed by screws while using glue or welding as well.

Embodiment 4

Figure 6:
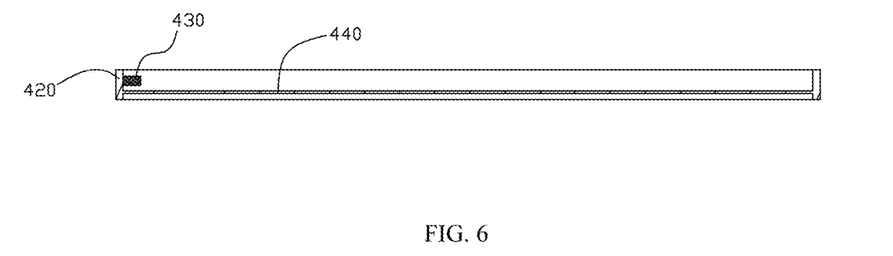
FIG. 6 is a cross-sectional view of a partially assembled vibration sounding device according to Embodiment 4 of the present disclosure.

As shown in FIG. 6, Embodiment 4 of the present disclosure is an improvement made on the basis of the above three embodiments.

The present embodiment is substantially the same as the above three embodiments, that is, the drive unit 430 is fixed on the border 420. The difference lies in that, in the present embodiment, the support plate 440 and the border 420 are formed as an integral structure. Optionally, a frame structure having a border and a middle frame can be made by using an integral molding method, thereby reducing the components, facilitating installation and fixation, and reducing the production cost.

Embodiment 5

Figure 7:
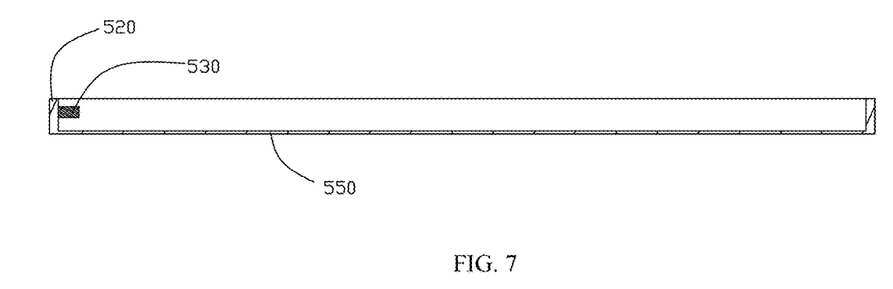
FIG. 7 is a cross-sectional view of a partially assembled vibration sounding device according to Embodiment 5 of the present disclosure.

As shown in FIG. 7, Embodiment 5 of the present disclosure is similar to Embodiment 4, and is also an improvement made on the basis of the above three embodiments.

The present embodiment is substantially the same as the above embodiments, and the drive unit 530 is fixed on the border 520. The difference lies in that, in this embodiment, the rear cover 550 and the border 520 are formed as an integral structure. Optionally, a structure having a border and a rear cover can be made by using an integral molding method, thereby reducing the components, facilitating installation and fixation, and reducing the production cost.

Embodiment 6

Figure 8:
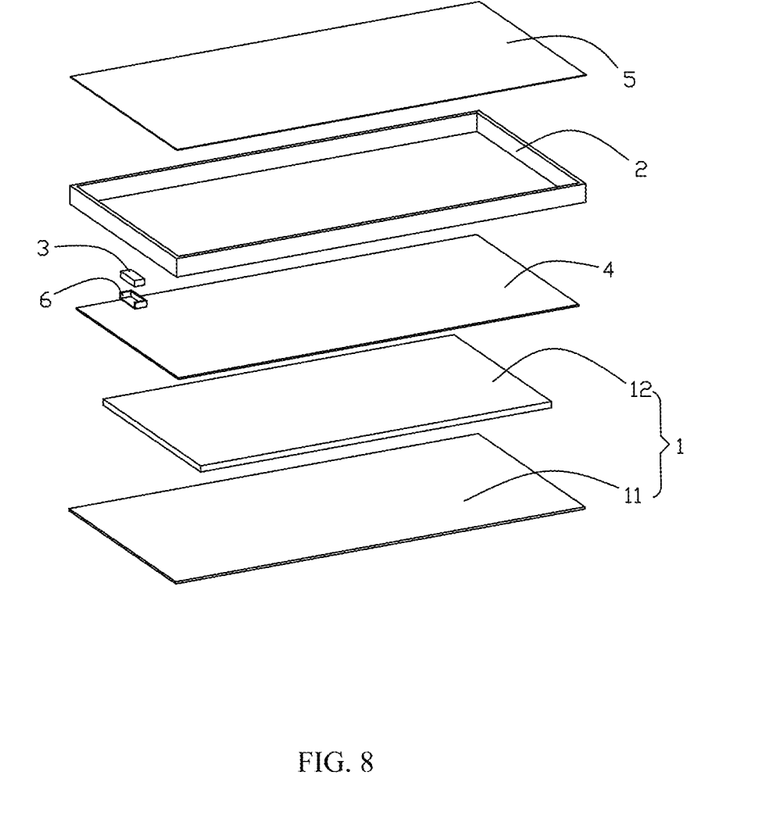
FIG. 8 is an exploded structural schematic diagram of a vibration sounding device according to Embodiment 6 of the present disclosure.
Figure 9:
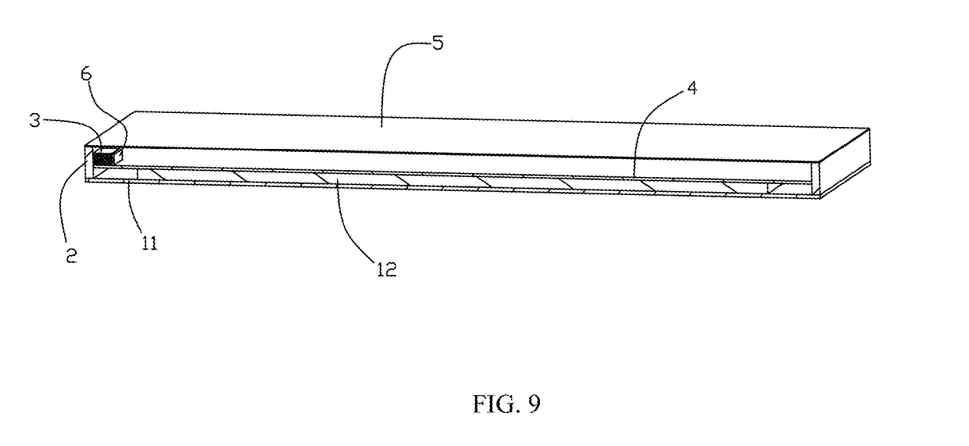
FIG. 9 is a cross-sectional view of a vibration sounding device according to Embodiment 6 of the present disclosure.
Figure 10:
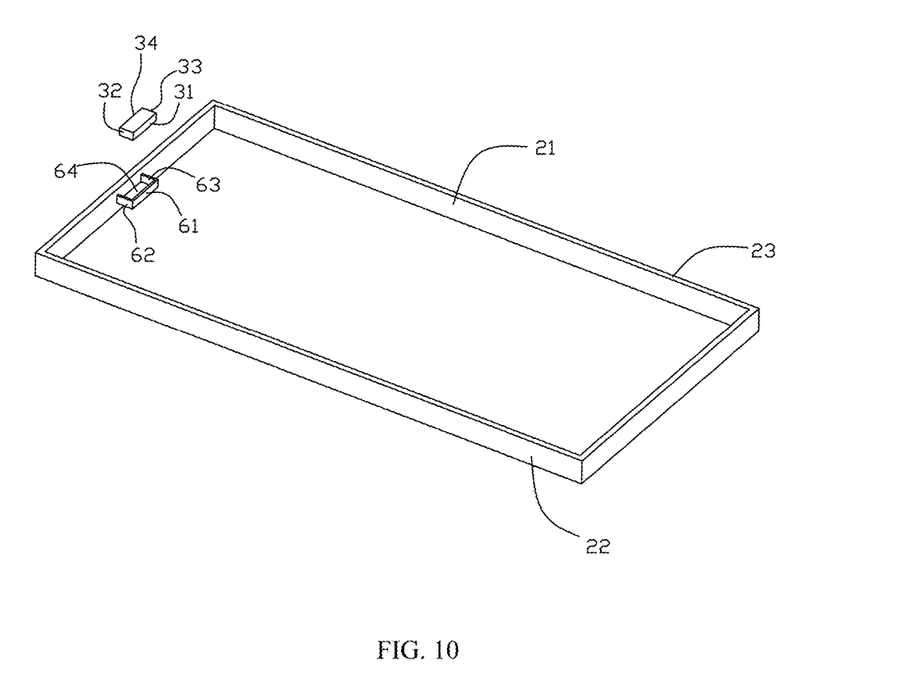
FIG. 10 is an assembling schematic diagram of a border and a drive unit of a vibration sounding device according to Embodiment 6 of the present disclosure.

As shown in FIGS. 8-10, Embodiment 6 of the present disclosure provides a vibration sounding device. The vibration sounding device includes a screen 1, a border 2 for supporting the screen 1, a drive unit 3 fixed on the border 2, a support plate 4, a rear cover 5, and a mounting bracket 6 for fixing the drive unit 3.

The rear cover 5 and the screen 1 are opposite to each other, and the border 2, the screen 1, and the rear cover 5 cooperatively define a closed internal space.

The border 2 is a frame structure perpendicular to the screen 1, and includes an internal surface 21 perpendicular to the screen 1, an external surface 22 perpendicular to the screen 1, an upper surface 23, and a lower surface. The internal surface 21 and the external surface 22 are opposite to each other, and the upper surface 23 and the lower surface connect the internal surface 21 with the external surface 22. The upper surface 23 is close to the screen 1, and is arranged opposite to the lower surface.

The screen 1 includes a glass panel 11 fixedly overlapping on the upper surface 23 of the border 2, and a display screen 12 laminated on the glass panel 11. The display screen 12 is used for displaying.

In the present embodiment, the support plate 4 abuts against a middle position of the internal surface 21 of the border 2; the support plate 4 plays a role of supporting the display screen 12, and the display screen 12 is sandwiched and fixed between the glass panel 11 and the support plate 4.

The rear cover 5 is fixed on the lower surface of the border 2. In other alternative embodiments, the glass panel 11 and the rear cover 5 can be respectively inserted into the border 2, and fixedly abut against the internal surface 21 of the border 2, as long as the function of assembling and fixation is achieved.

The drive unit 3 is a piezoelectric actuator or an electromagnetic actuator, and is fixed on the internal surface of the border 2 by the mounting bracket 6. As shown in FIG. 9, the rear cover 5 is spaced from the support plate 4, the drive unit 3 is fixed between the support plate 4 and the rear cover 5 by the mounting bracket 6, and the drive unit 3 is respectively spaced from the screen 1 and the rear cover 5. In that way, the drive unit 3 does not occupy space, which is favorable for thinning and miniaturization of the product.

As shown in FIG. 10, the drive unit 3 includes a bottom surface parallel to the screen 1 and a side surface perpendicular to the screen 1. The side surface includes an lamination surface 34 laminated on the internal surface 21 of the border 2, a first surface 31 parallel to the lamination surface, a second surface, and a third surface. The first surface and the lamination surface are opposite to each other, the second surface 32 and the third surface 33 connect the first surface 31 with the lamination surface 34, and the second surface 32 and the third surface 33 are opposite to each other.

Correspondingly, the mounting bracket 6 includes a first sidewall 61 laminated on the first surface 31, a second sidewall 62 laminated on the second surface 32, a third sidewall 63 laminated on the third surface 33, and a bottom plate 64 laminated on a bottom surface of the drive unit 3.

The bottom plate 64, the first sidewall 61, the second sidewall 62, and the third sidewall 63 cooperatively define a semi-closed accommodation groove, and the drive unit 3 is accommodated in the accommodation groove. A side of the second sidewall 62 close to the internal surface 21, a side of the third sidewall 63 close to the internal surface 21, and a side of the bottom plate 64 close to the internal surface 21 are fixed with the internal surface 21. The fixation can be performed by welding and/or by using an adhesive. Further, the drive unit 3 may also be fixed with the mounting bracket 6 by using an adhesive or by welding.

The drive unit 3 is fixed on the mounting bracket 6 and is laminated on the border 2. The driving force provided by the drive unit 3 is directly transmitted to the screen 1 and/or the rear cover 5 by the border 2, to drive the screen 1 and/or the rear cover 5 to vibrate and sound, particularly, in the present embodiment, to drive the glass panel 11 to vibrate and sound.

Embodiment 7

Figure 11:
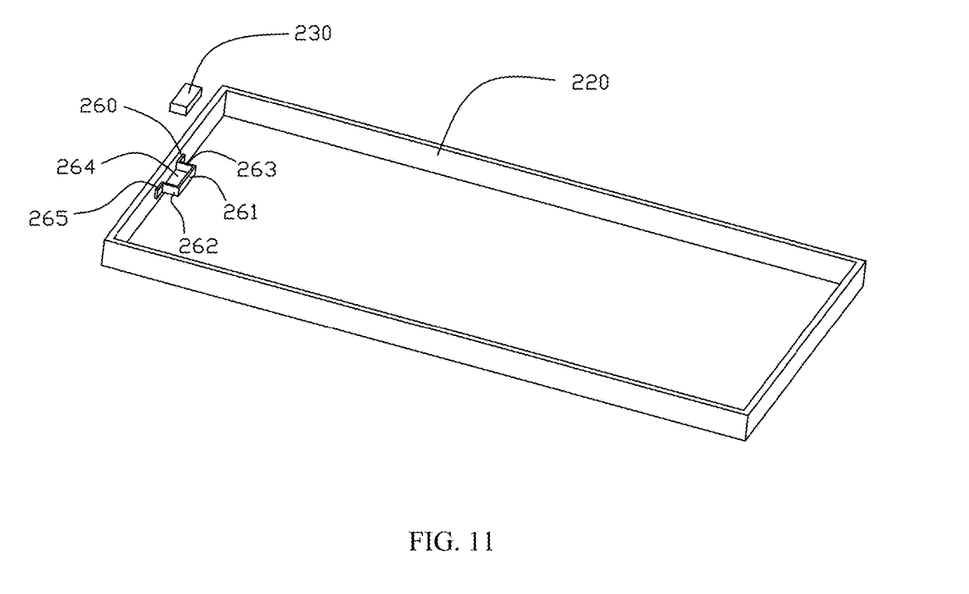
FIG. 11 is an assembling schematic diagram of a border and a drive unit of a vibration sounding device according to Embodiment 7 of the present disclosure.

As shown in FIG. 11, Embodiment 7 of the present disclosure is substantially to the same as Embodiment 6.

The mounting bracket 260 includes a first sidewall 261, a second sidewall 262, a third sidewall 263, and a bottom plate 264. The difference lies in that, in the present embodiment, the mounting bracket 260 further includes an extending portion 265 respectively extending from the second sidewall 262 and the third sidewall 263 along a direction away from the two sides of the drive unit 230. The extending portion 265 is fixedly laminated on the internal surface of the border by using an adhesive or welding. Further, the drive unit 230 may also be fixed with the mounting bracket 260 by using an adhesive or welding.

The setting of the extending portion 265 can increase the size of the contact area between the mounting bracket 260 and the border 220, and the fixing reliability of the drive unit 230 and the border 220 can be enhanced by either using an adhesive or welding.

Embodiment 8

Figure 12:
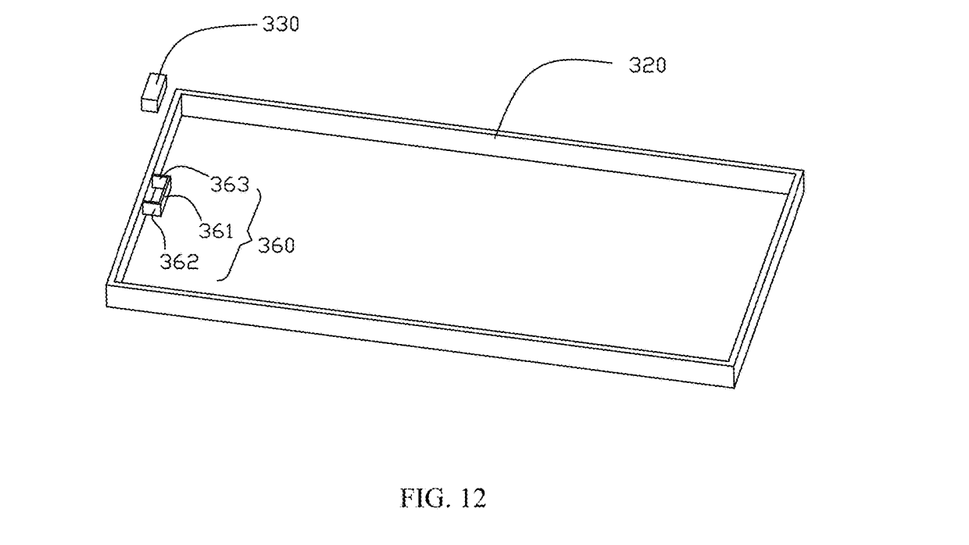
FIG. 12 is an assembling schematic diagram of a border and a drive unit of a vibration sounding device according to Embodiment 8 of the present disclosure.

As shown in FIG. 12, Embodiment 8 of the present disclosure is substantially the same as Embodiment 6.

The mounting bracket 360 includes a first sidewall 361, a second sidewall 362 and a third sidewall 363. The difference lies in that, in the present embodiment, the mounting bracket 360 has no bottom plate, and the drive unit 330 is surrounded and fixed by the first sidewall 361, the second sidewall 362, and the third sidewall 363. The first sidewall 361, the second sidewall 362, and the third sidewall 363 are tightly laminated on the drive unit 330, which can achieve the same effect of fixing the drive unit 330 onto the border 320. Further, the drive unit 330 may also be fixed with the mounting bracket 360 by using an adhesive or welding.

Embodiment 9

Figure 13:
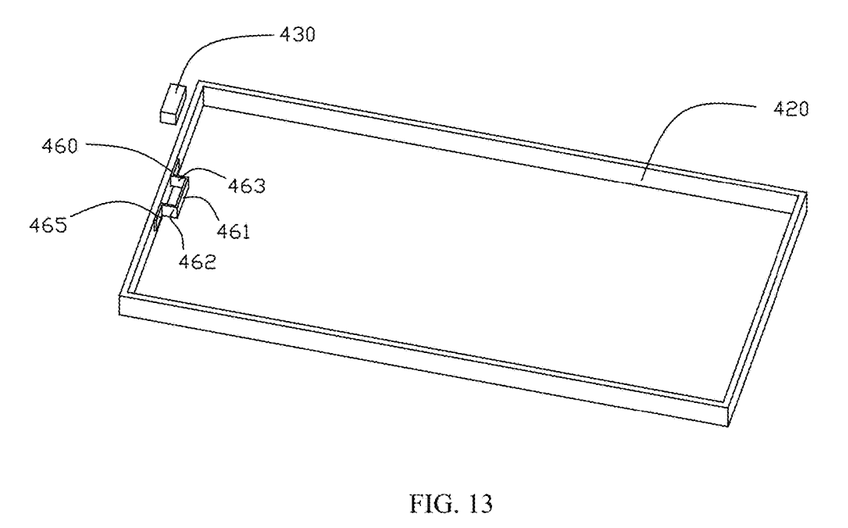
FIG. 13 is an assembling schematic diagram of a border and a drive unit of a vibration sounding device according to Embodiment 9 of the present disclosure.

As shown in FIG. 13, Embodiment 9 of the present disclosure is substantially the same as Embodiment 7.

The mounting bracket 460 includes a first sidewall 461, a second sidewall 462, and a third sidewall 463. The mounting bracket 460 further includes an extending portion 465 extending respectively from the second sidewall 462 and the third sidewall 463 to two sides of the drive unit. The extending portion 465 is fixed with the internal surface.

The difference lies in that, in the present embodiment, the mounting bracket has no bottom plate, and the drive unit 430 is surrounded and fixed by the first sidewall 461, the second sidewall 462, and the third sidewall 463. The first sidewall 461, the second sidewall 462, and the third sidewall 463 are tightly laminated on the driving unit 430, which can has the same effect of fixing the driving unit 430 with the border 420.

The setting of the extending portion 465 can increase the size of the contact area between the mounting bracket 460 and the border 420, and the fixing reliability of the drive unit 430 and the border 420 can be enhanced by either using an adhesive or welding.

Embodiment 10

Figure 14:
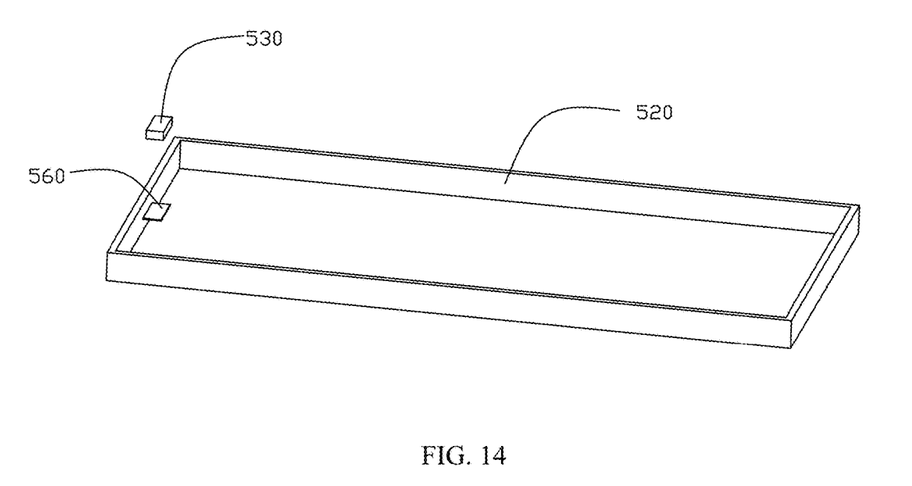
FIG. 14 is an assembling schematic diagram of a border and a drive unit of a vibration sounding device according to Embodiment 10 of the present disclosure.

As shown in FIG. 14, the invention idea of Embodiment 10 of the present disclosure is similar with Embodiments 6-9 above.

The drive unit 530 is fixed on the border 520 by the mounting bracket 560. The difference lies in that, in the present embodiment, the mounting bracket 560 is a flat plate, and the bottom surface of the drive unit 530 is laminated on the mounting bracket 560. That is to say, in the present embodiment, the mounting bracket 560 includes a bottom plate but no sidewall, and the drive unit is fixed only by the bottom plate. Further, the drive unit 530 may also be fixed with the mounting bracket 560 by using an adhesive or welding. The present embodiment simplifies the structure and reduces the production cost.

Embodiment 11

Figure 15:
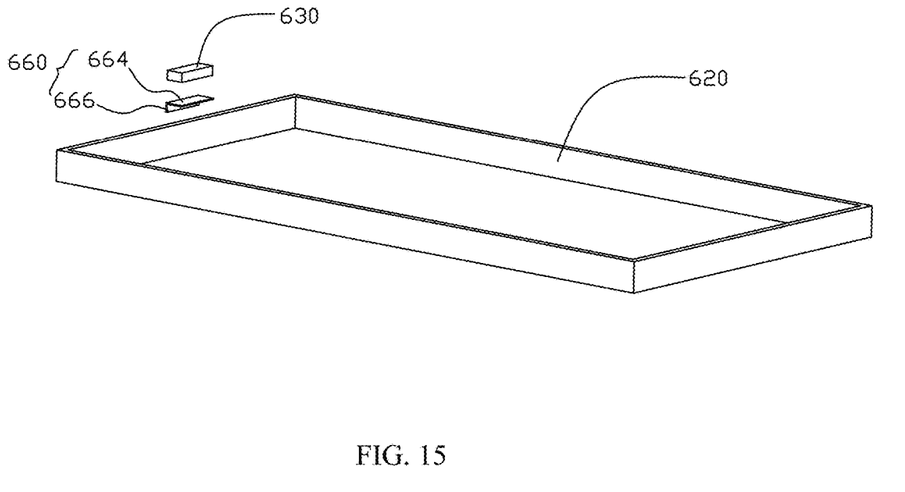
FIG. 15 is an assembling schematic diagram of a border and a drive unit of a vibration sounding device according to Embodiment 11 of the present disclosure.

As shown in FIG. 15, Embodiment 11 of the present disclosure is an improvement made on the basis of Embodiment 10.

A drive unit 630 is fixed on a border 620 by a mounting bracket 660. The difference lies in that, in the present embodiment, the mounting bracket 660 includes a bottom plate 664 and a fixing portion 666 bending and extending from the bottom plate 664 toward a direction away from the drive unit. The fixing portion 666 is laminated on the border 620, and is fixed with the border by using an adhesive or welding. In that way, the reliability of the product of this present embodiment is further improved on the basis of Embodiment 10.

Embodiment 12

Figure 16:
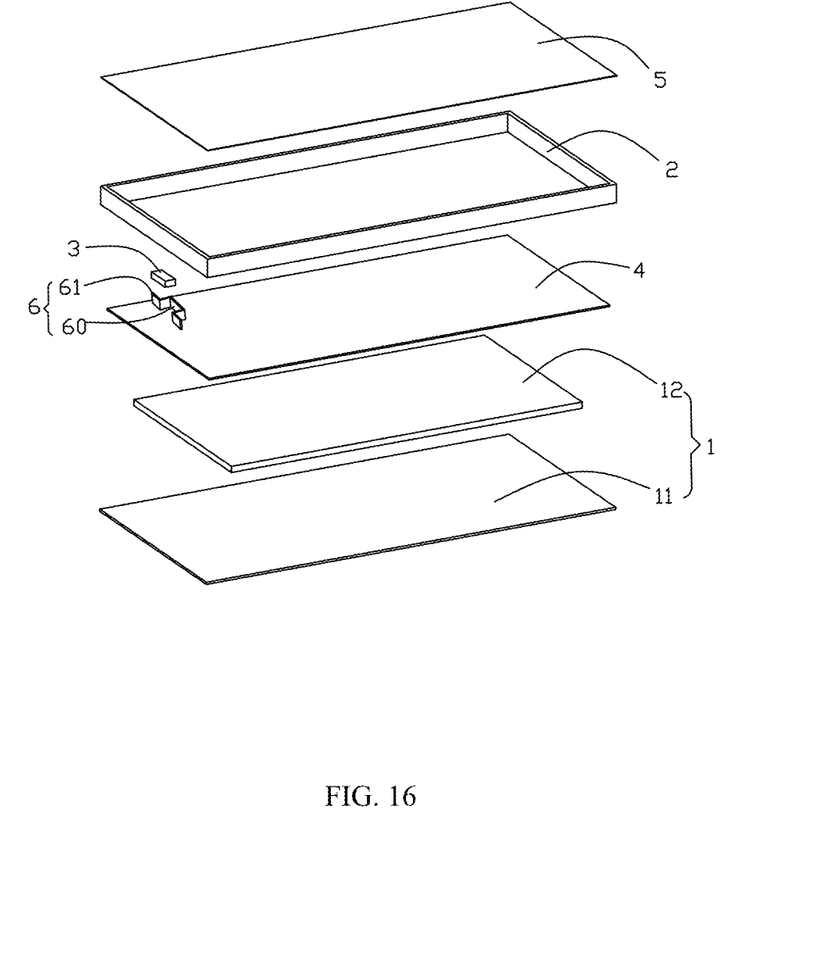
FIG. 16 is an exploded structural schematic diagram of a vibration sounding device according to Embodiment 12 of the present disclosure.
Figure 17:
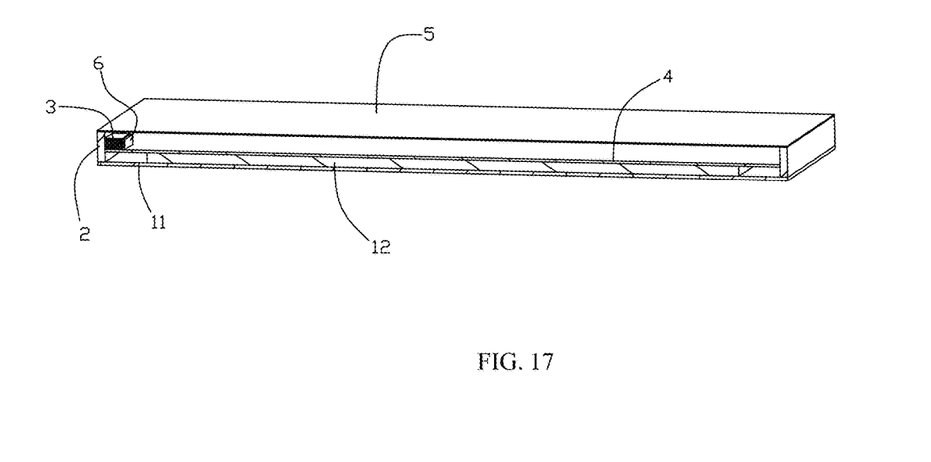
FIG. 17 is a cross-sectional view of a vibration sounding device according to Embodiment 12 of the present disclosure.
Figure 18:
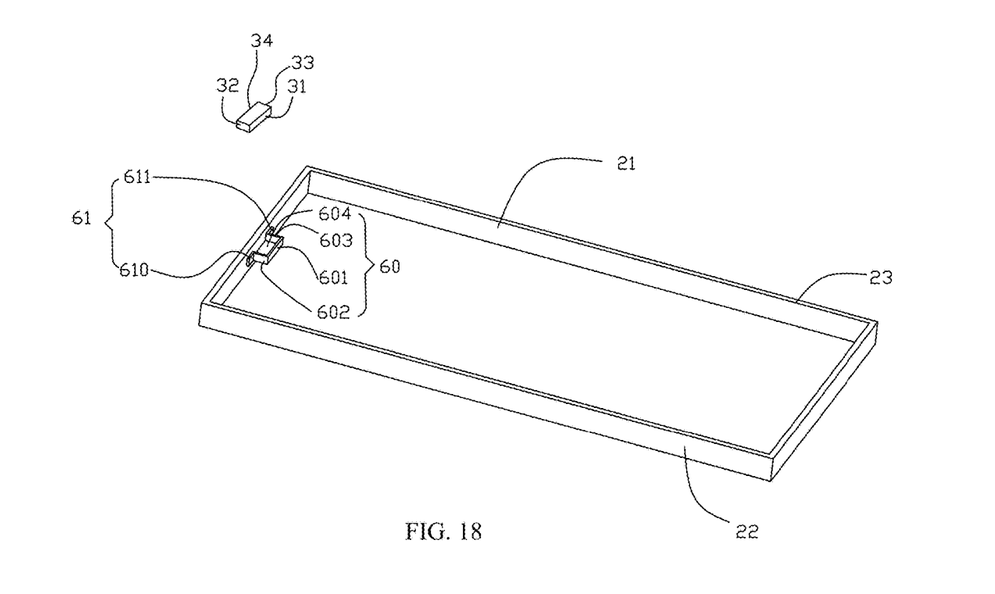
FIG. 18 is an assembling schematic diagram of a border and a drive unit of a vibration sounding device according to Embodiment 12 of the present disclosure.

As shown in FIGS. 16-18, Embodiment 12 of the present disclosure provides a vibration sounding device, including a screen 1, a border 2 for supporting the screen 1, a drive unit 3 fixed on the border 2, a support plate 4, a rear cover 5, and a mounting bracket 6 for fixing the drive unit 3.

The rear cover 5 and the screen 1 are opposite to each other, and the border 2, the screen 1, and the rear cover 5 cooperatively define a closed internal space.

The border 2 is a frame structure perpendicular to the screen 1, and includes an internal surface 21 perpendicular to the screen 1, an external surface 22 perpendicular to the screen 1, an upper surface 23, and a lower surface. The internal surface 21 and the external surface 22 are opposite to each other. The upper surface 23 and the lower surface connect the internal surface 21 with the external surface 22. The upper surface 23 is close to the screen 1, and the upper surface 23 is opposite to the lower surface.

The screen 1 includes a glass panel 11 fixedly overlapping the upper surface 23 of the border 2, and a display screen 12 laminated on the glass panel 11, and the display screen 12 is used for display.

In the present embodiment, the support plate 4 abuts against a middle position of the internal surface 21 of the border 2. The support plate 4 plays a role of supporting the display screen 12, and the display screen 12 is sandwiched and fixed between the support plate 4 and the glass panel 12.

The rear cover 5 is fixed on the lower surface of the border 2. In other alternative embodiments, the glass panel 11 and the rear cover 5 can be respectively inserted into the border 2, and can abut against the internal surface 21 of the border 2, as long as the function of assembling and fixation can be achieved.

The drive unit 3 is a piezoelectric actuator or an electromagnetic actuator, and is fixed on the internal surface of the border 2 by the mounting bracket 6. As shown in FIG. 17, the rear cover 5 is spaced from the support plate 4, the drive unit 3 is fixed between the support plate 4 and the rear cover 5 by the mounting bracket 6, and is respectively spaced from the screen 1 and the rear cover 5. In that way, the drive unit 3 does not occupy space, which is favorable for thinning and miniaturization of the product.

As shown in FIG. 18, the drive unit 3 includes a bottom surface parallel to the screen 1 and a side surface perpendicular to the screen 1, wherein the side surface includes a lamination surface 34 laminated on the internal surface 21 of the border 2, a first surface 31 parallel to the lamination surface 34, a second surface, and a third surface. The second surface 32 and the third surface 33 are opposite to each other. The first surface 31 and the lamination surface 34 are opposite to each other, the second surface 32 and the third surface 33 are opposite to each other, and the second surface 32 and the third surface 33 connect the first surface 31 with the lamination surface 34.

Correspondingly, the mounting bracket 6 includes a support portion 60 for fixing and supporting the drive unit 3, and an extending portion 61 extending from an edge of the support portion 60 fixed with the internal surface along a direction away from the drive unit 3, and the extending portion 61 is fixedly laminated on the internal surface. In the present embodiment, the support portion 60 includes a first sidewall 601 laminated on the first surface 31, a second sidewall 602 laminated on the second surface 32, a third sidewall 603 laminated on the third surface 33, and a bottom plate 604 laminated on the bottom surface of the drive unit 3.

The bottom plate 604, the first sidewall 601, the second sidewall 602 and the third sidewall 603 cooperatively define a semi-closed accommodation groove, and the drive unit 3 is accommodated in the accommodation groove. A side of the second sidewall 602 close to the internal surface 21 of the border 2, a side of the third sidewall 603 close to the internal surface 21 of the border 2, and a side of the bottom plate 604 close to the internal surface 21 of the border 2 are respectively fixed with the internal surface 21. The fixing method can be welding or using an adhesive. Further, the drive unit 3 may also be fixed with the mounting bracket 6 by using an adhesive or by welding.

The extending portion 61 further includes two first extending portions 610, 611 extending respectively from the second sidewall 602 and the third sidewall along a direction away from two sides of the drive unit 3. The first extending portions 610, 611 are fixedly laminated on the internal surface of the border by using an adhesive or welding.

The drive unit 3 is fixed on the mounting bracket 6 and is laminated on the border 2. The border 2 transmits the driving force provided by the drive unit 3 directly to the screen 1 and/or the rear cover 5, to drive the screen 1 and/or the rear cover 5 to vibrate and sound, particularly, in the present embodiment, to drive the glass panel 11 to vibrate and sound.

Embodiment 13

Figure 19:
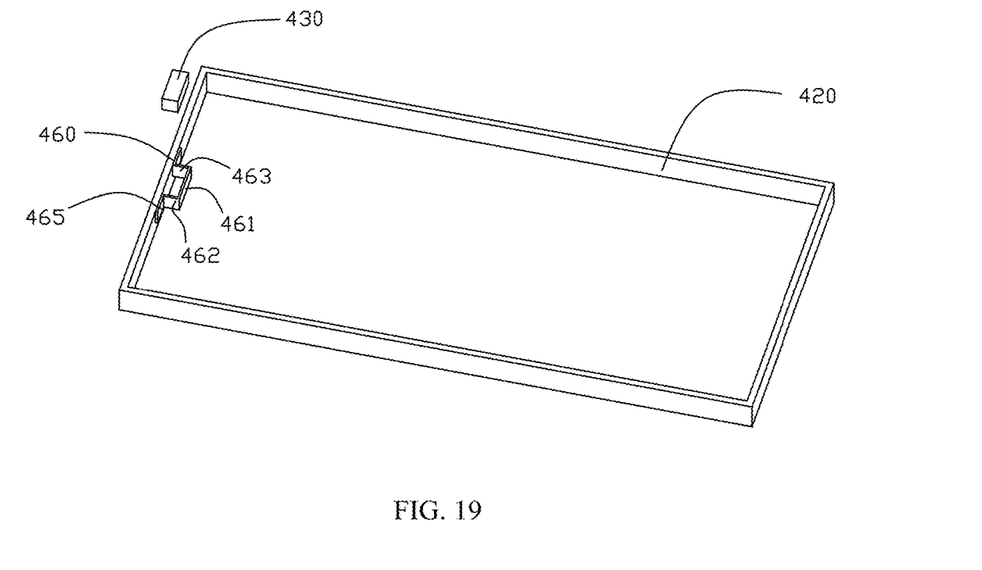
FIG. 19 is an assembling schematic diagram of a border and a drive unit of a vibration sounding device according to the embodiment 13 of the present disclosure.

As shown in FIG. 19, Embodiment 13 of the present disclosure is substantially the same as Embodiment 12.

The mounting bracket 460 includes a first sidewall 461, a second sidewall 462, and a third sidewall 463, and the mounting bracket 460 further includes a first extending portion 465 extending respectively from the second sidewall 462 and the third sidewall 463 away from two sides of the drive unit 3. The first extending portion 465 is fixed with the internal surface.

The difference lies in that, in the present embodiment, the mounting bracket has no bottom plate, the drive unit 430 is surrounded and fixed by the first sidewall 461, the second sidewall 462, and the third sidewall 463, and the first sidewall 461, the second sidewall 462, and the third sidewall 463 are tightly laminated on the drive unit 430, which can also achieve the same effect of fixing the drive unit 430 onto the border 420.

The setting of the first extending portion 465 can increase the size of the contact area between the mounting bracket 460 and the border 420, and the fixing reliability of the drive unit 430 and the border 420 can be enhanced by either adhering or welding.

Embodiment 14

Figure 20:
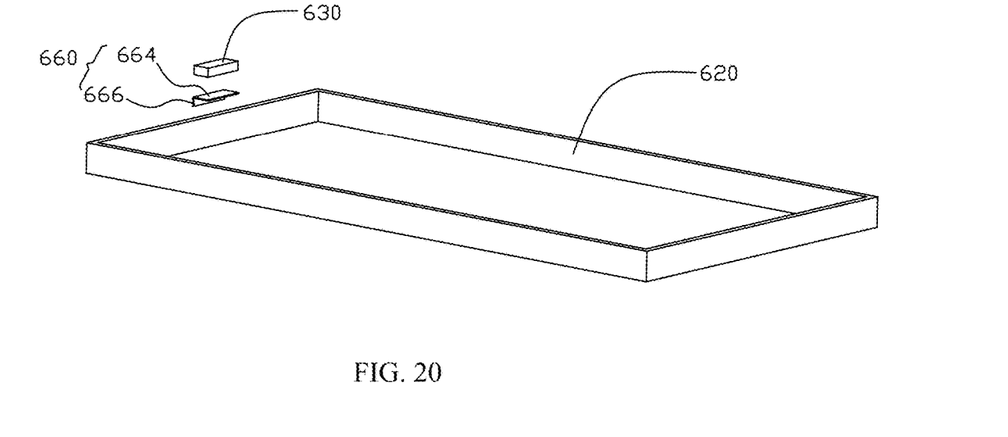
FIG. 20 is an assembling schematic diagram of a border and a drive unit of a vibration sounding device according to Embodiment 14 of the present disclosure.

As shown in FIG. 20, the invention idea of Embodiment 14 of the present disclosure is basically the same as Embodiments 12-13 above.

The drive unit 630 is fixed on the border 620 by the mounting bracket 660. The difference lies in that, in the present embodiment, the support portion includes a bottom plate 664 and a second extending portion 666 extending from the bottom plate 664 along a direction away from the drive unit, and the second extending portion 666 is laminated on the border 620 and is fixed with the border 620 by using an adhesive or welding, in that way, the fixing reliability of the product of this embodiment is further improved as compared with Embodiment 13.

Preferably, the drive unit of the above embodiments of the present disclosure is a piezoelectric actuator or an electromagnetic actuator.

Compared with the prior art, the present disclosure adopts a new vibration sounding device, the drive unit is fixed on the internal surface of the border by the mounting bracket, and the screen is fixed on the border, and the driving force of the drive unit can be transmitted to the screen and/or the rear cover directly by the border, which has high transmission efficiency and less energy loss. Thus, the vibration sounding device provided by the present disclosure has the advantages of strong vibration performance, simple configuration, and no space occupation, and is more favorable for the thinning and miniaturization of the product.

Although the above has been shown and described the embodiment of the present disclosure, it is understandable that the embodiments above are exemplary, and should not be interpreted as limiting the present disclosure, and those skilled in the art can make changes, modifications, replacements and deformations to the embodiments above within the scope of the present disclosure.

What is claimed is:

1. A vibration sounding device, comprising:
   a screen,
   a rear cover arranged opposite to the screen,
   a border for supporting the screen and the rear cover, and
   a drive unit;
   wherein the border is perpendicular to the screen; the border comprises an internal surface perpendicular to the screen, an external surface opposite to the internal surface, an upper surface and a lower surface, the upper surface and the lower surface connect the internal surface with the external surface, the upper surface is arranged opposite to the lower surface and is close to the screen, and the lower surface is close to the rear cover; and
   wherein the drive unit is fixed on the internal surface so that the border can transmit the vibration from the drive unit to the screen and/or the rear cover.

2. The vibration sounding device as described in claim 1, wherein the border comprises a sidewall perpendicular to the screen, the sidewall comprises the internal surface perpendicular to the screen, the external surface opposite to the internal surface, the upper surface, and the lower surface, and the upper surface and the lower surface connect the internal surface with the external surface.

3. The vibration sounding device as described in claim 2, wherein the drive unit is respectively spaced from the screen and the rear cover; the drive unit comprises a fixing surface laminated on the internal surface of the border, the fixing surface comprises an extending portion extending along a direction away from the drive unit, and the extending portion is fixed with the internal surface.

4. The vibration sounding device as described in claim 3, wherein the extending portion symmetrically extends from two opposite sides of the drive unit along opposite directions, respectively.

5. The vibration sounding device as described in claim 2, wherein the drive unit is fixed with the internal surface of the border by using an adhesive.

6. The vibration sounding device as described in claim 2, wherein the drive unit is fixed on the internal surface of the border by welding.

7. The vibration sounding device as described in claim 3, wherein a fixing hole is defined in the extending portion, and the drive unit is fixed with the border by engaging with the fixing hole.

8. The vibration sounding device as described in claim 7, wherein a screw hole is defined in the internal surface of the border, the screw hole corresponds to the fixing hole, and the drive unit is fixed with the border by a screw.

9. The vibration sounding device as described in claim 2, further comprising a support plate fixed on the border; wherein the screen comprises a glass panel fixed on the upper surface of the border, and a display screen laminated on the glass panel; the support plate is used for supporting the display screen; and the display screen is sandwiched and fixed between the glass panel and the support plate.

10. The vibration sounding device as described in claim 9, wherein the support plate and the border are formed as an integral structure.

11. The vibration sounding device as described in claim 2, wherein the rear cover and the border are formed as an integral structure.

12. The vibration sounding device as described in claim 1, further comprising a mounting bracket fixed on the internal surface, wherein the drive unit is fixed on the mounting bracket, and the drive unit drives the screen and/or the rear cover to vibrate and sound by the border.

13. The vibration sounding device as described in claim 12, wherein the drive unit is respectively spaced from the screen and the rear cover; the drive unit comprises a bottom surface parallel to the screen and a side surface perpendicular to the screen, and the side surface comprises a lamination surface laminated on the internal surface of the border.

14. The vibration sounding device as described in claim 13, wherein the side surface further comprises a first surface opposite to the lamination surface, a second surface, and a third surface, the second surface and the third surface connect the first surface with the lamination surface, and the second surface and the third surface are arranged opposite to each other.

15. The vibration sounding device as described in claim 14, wherein the mounting bracket comprises a first sidewall laminated on the first surface, a second sidewall laminated on the second surface, and a third sidewall laminated on the third surface; the second sidewall is fixed with the internal surface, and the third sidewall is fixed with the internal surface; and the mounting bracket and the internal surface cooperatively define an accommodation groove for accommodating and fixing the drive unit.

16. The vibration sounding device as described in claim 13, wherein the mounting bracket comprises a bottom plate laminated on the bottom surface of the drive unit.

17. The vibration sounding device as described in claim 16, wherein the mounting bracket comprises a fixing portion bending and extending from the bottom plate along a direction away from the drive unit, and the fixing portion is laminated and fixed on the internal surface of the border.

18. The vibration sounding device as described in claim 16, further comprising a support plate fixed on the border, wherein the screen comprises a glass panel and a display screen, the glass panel overlaps and is fixed with the upper surface of the border, and the display screen is fixed and accommodated in the border by the glass panel; the support plate is used for supporting the display screen; and the display screen is sandwiched and fixed between the support plate and the glass panel.

19. The vibration sounding device as described in claim 18, wherein the rear cover is spaced from the support plate.

* * * * *